(12) United States Patent
Fujita et al.

(10) Patent No.: US 7,290,643 B2
(45) Date of Patent: Nov. 6, 2007

(54) FRONT FORK IN TWO-WHEELED MOTOR VEHICLE OR THE LIKE

(76) Inventors: Nobuaki Fujita, c/o Showa Corporation 2601, Aza-Komagawa, Matsubara, Asaba-cho, Iwata-gun, Shizuoka (JP); Kimitoshi Sato, 2601, Aza-Komagawa, Matsubara, Asaba-cho, Iwata-gun, Shizuoka (JP)

( * ) Notice: Subject to any disclaimer, the term of this patent is extended or adjusted under 35 U.S.C. 154(b) by 0 days.

(21) Appl. No.: 10/738,060

(22) Filed: Dec. 17, 2003

(65) Prior Publication Data

US 2005/0133320 A1    Jun. 23, 2005

(51) Int. Cl.
*F16F 9/34* (2006.01)
(52) U.S. Cl. .............................. 188/322.15; 188/282.5; 188/313
(58) Field of Classification Search ............. 188/24.11, 188/24.22, 297, 313, 314, 315, 282.5, 322.13, 188/322.15; 280/279; 137/513.3
See application file for complete search history.

(56) References Cited

FOREIGN PATENT DOCUMENTS

| JP | 56147938 A | * | 11/1981 |
| JP | 58-125749 | | 8/1983 |
| JP | 60157496 | | 10/1985 |
| JP | 2-122241 | | 10/1990 |
| JP | 1059256 A | * | 3/1998 |
| JP | 10-122290 | | 5/1998 |
| JP | 2002-139089 A | * | 5/2002 |

* cited by examiner

*Primary Examiner*—Melody M. Burch

(57) ABSTRACT

In a front fork in a two-wheeled vehicle or motor vehicle, a partition wall member sectioning an oil reservoir chamber into upper end lower sides is provided in an upper portion of a hollow pipe. A center hole and an expansion and compression common flow passage are formed in the partition wall member. The expansion and compression common flow passage is provided with a deflection valve in a state of being supported in an inner periphery, and a check valve in a state of being supported in an outer periphery, in such a manner that an outer periphery of the deflection valve and an inner periphery of the check valve are at least partially overlapped. A first spring supporting the deflection valve in a back surface and a second spring supporting the check valve in a back surface are provided. A small gap is provided in the overlapping portion between the deflection valve and the check valve.

4 Claims, 6 Drawing Sheets

FRONT FORK IN TWO-WHEELED MOTOR
VEHICLE OR THE LIKE

BACKGROUND OF THE INVENTION

1. Field of the Invention

The present invention relates to a front fork in a two-wheeled motor vehicle or the like.

2. Description of the Related Art

In a conventional, front fork in a two-wheeled motor vehicle, as described in Japanese Unexamined Utility Model Publication No. 60-157496, there is a structure in which an inner tube in a vehicle body side is slidably inserted into an outer tube in a wheel side. A hollow pipe is erected in a bottom portion of the outer tube. A piston portion provided in an upper portion of the hollow pipe is slidably provided on an inner periphery of the inner tube. An oil chamber provided in an outer side of the hollow pipe is sectioned into upper and lower sides by a piston provided in a leading end portion of the inner tube. An oil reservoir chamber communicating with the oil chamber is provided in an inner side of the hollow pipe, and a gas chamber in an upper portion of the oil reservoir chamber is provided in the interior of the inner tube.

In the prior art, a partition wall member sectioning the oil reservoir chamber into upper and lower sides is provided in the upper portion of the hollow pipe. The partition wall member is provided in parallel with a compression side flow passage and an expansion flow passage which communicates the upper and lower oil reservoir chambers. The compression side flow passage is provided with a compression side slide valve and a spring for opening the slide valve when working fluid reaches a fixed flow speed at a middle piston speed range, thereby generating a compression side damping force. The expansion side flow passage is provided with an expansion side check valve.

The prior art has the following problems.

(1) Since the compression side flow passage and the expansion side flow passage are provided in parallel in the partition wall member, a stroke is changed from an expansion stroke to a compression stroke while the expansion side check valve is not completely closed, particularly when being changed from the expansion stroke to the compression stroke. There is generated a phenomenon that the working fluid flows from the expansion side flow passage without passing through the compression side flow passage during compression, so that a response of the damping force when changing between the expansion and compression strokes is deteriorated.

(2) The compression side damping force is generated by the slide valve, in place of a deflection valve. Accordingly, it is impossible to obtain a damping force based on a deflection property of the deflection valve in the middle piston speed range. No buckling feeling (no damping feeling) is generated in the middle speed range.

(3) The compression side damping force is set and changed only by a spring constant of a spring energizing the slide valve and adjustment of a set load. There is no freedom of setting and changing the damping force.

SUMMARY OF THE INVENTION

An object of the present invention is to improve damping force response of damping force during the transition between expansion and compression strokes in a front fork in a two-wheeled motor vehicle. A buckling feeling is applied to a compression side damping force in a middle speed range, and freedom of setting and changing the compression side damping force is improved.

In accordance with the present invention, there is provided a front fork in a two-wheeled motor vehicle. An inner tube in a vehicle body side is slidably inserted into an outer tube in a wheel side. A hollow pipe is erected in a bottom portion of the outer tube. A piston portion is provided in an upper portion of the hollow pipe being slidably provided on an inner periphery of the inner tube. An oil chamber is provided in an outer side of the hollow pipe being sectioned into upper and lower sides by a piston provided in a leading end portion of the inner tube, and an oil reservoir chamber communicated with the oil chamber is provided in an inner side of the hollow pipe. A gas chamber in an upper portion of the oil reservoir chamber is provided in the interior of the inner tube. A partition wall member sectioning the oil reservoir chamber into upper and lower sides is provided in an upper portion of the hollow pipe. The partition wall member is provided with a valve guide having a center hole. A common flow passage for expansion and compression is formed in a periphery of the valve guide. The common flow passage communicates between the upper and lower oil reservoir chambers. The common flow passage for expansion and compression formed in the partition wall member is provided with an annular deflection valve when supported in an inner periphery, and an annular check valve when supported in an outer periphery. The outer periphery of the deflection valve and the inner periphery of the check valve are partially overlapped so as to position the deflection valve in a side of the upper oil reservoir chamber. A first spring supporting the deflection valve in a back surface and opening the deflection valve when the working fluid reaches a fixed flow speed is provided. A second spring supporting the check valve in a back surface is provided. A small gap is provided in the overlapping portion between the deflection valve and the check valve.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 6A and 6B show the partition wall member, in which

DESCRIPTION OF THE PREFERRED EMBODIMENTS

Figure 1:
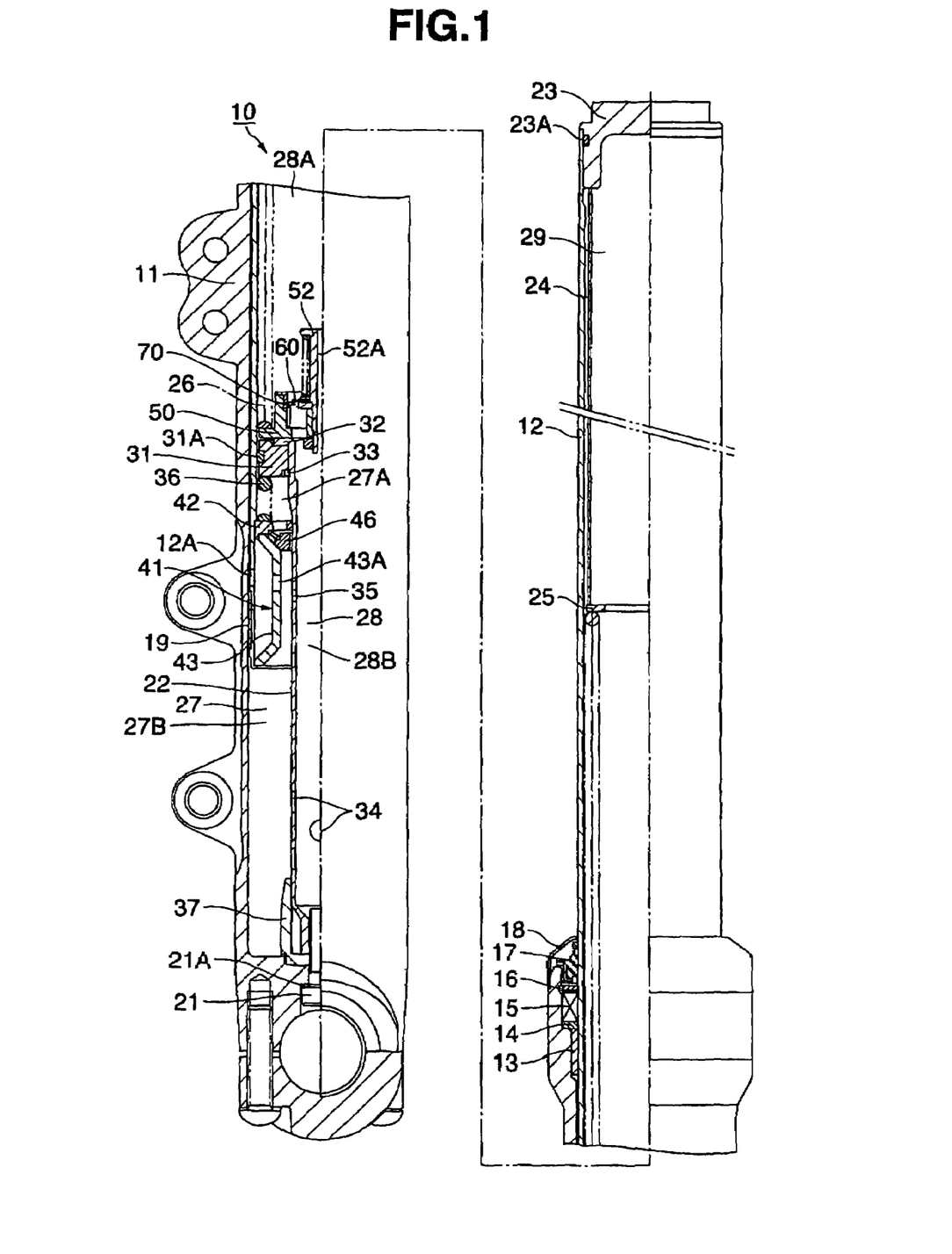
FIG. 1 is a general cross sectional view showing a front fork in an expanded state.
Figure 2:
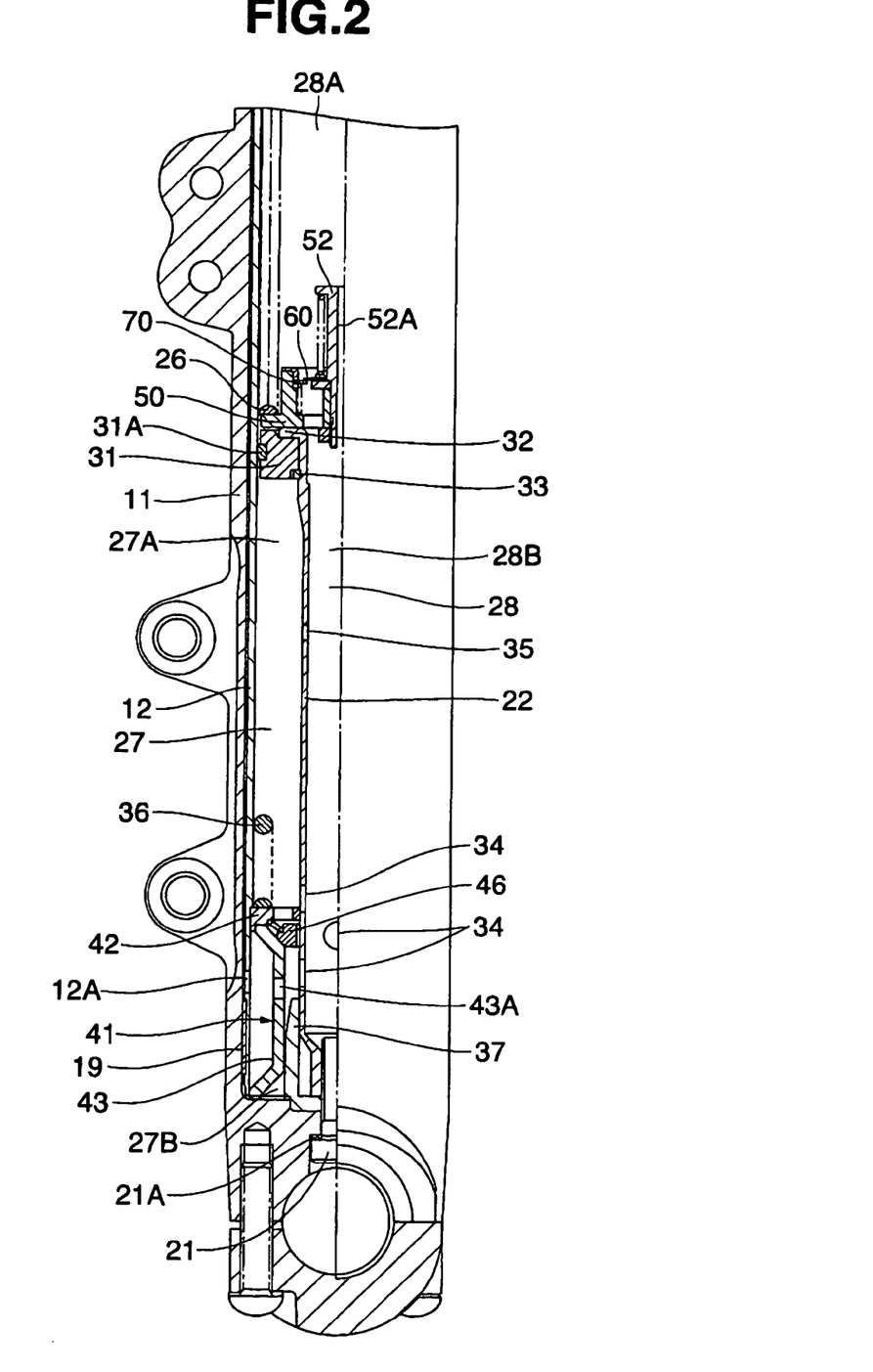
FIG. 2 is a cross sectional view showing the front fork in a compressed state.
Figure 3:
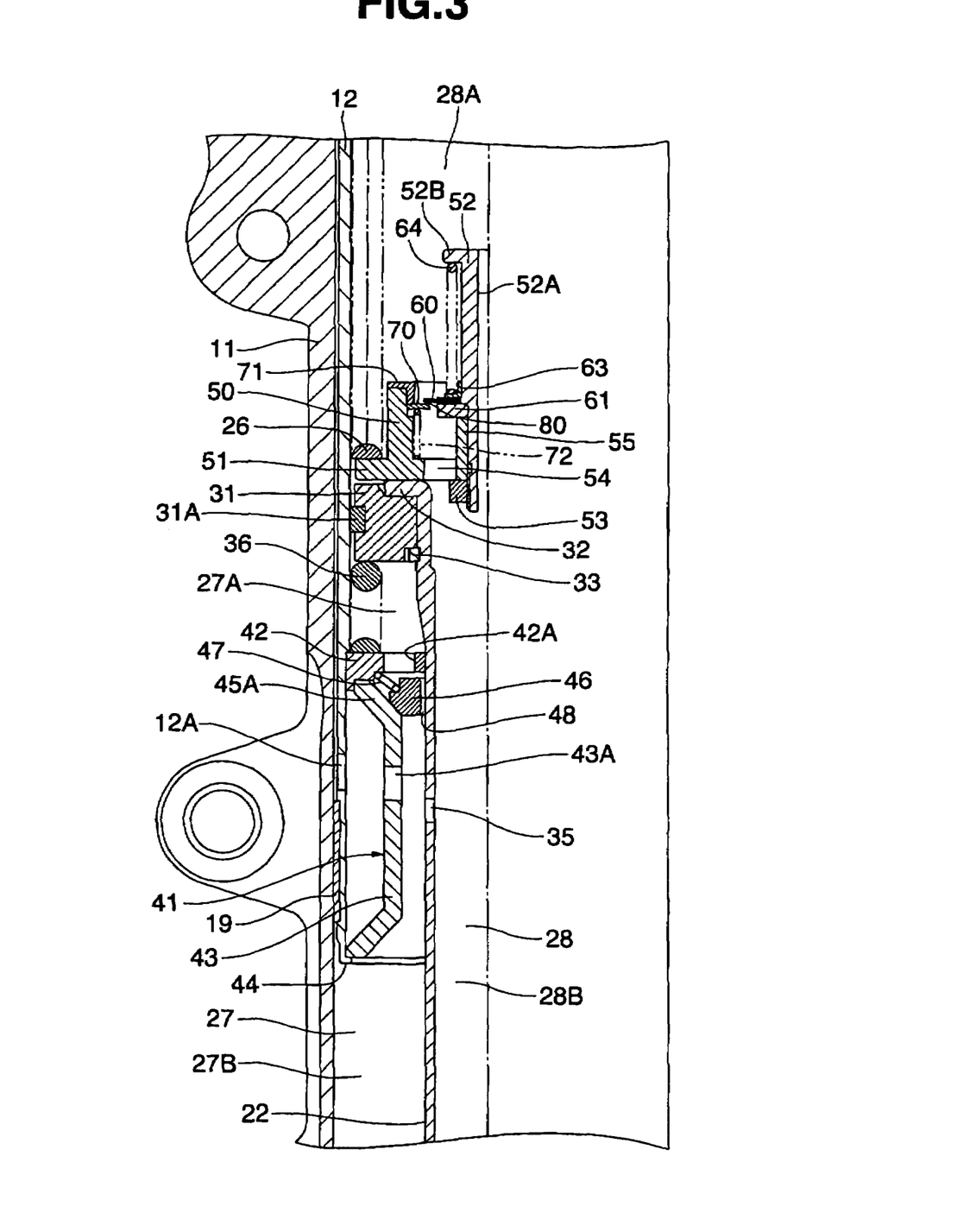
FIG. 3 is an enlarged view of a main portion in FIG. 1.

A front fork 10 is used in a two-wheeled motor vehicle or the like, and is structured, as shown in FIGS. 1 to 3, such that an inner tube 12 in a vehicle body side is slidably inserted to an outer tube 11 in which one end is closed and another end is opened. The outer tube 11 is provided in a wheel side. A guide bush 13, a seal spacer 14, an oil seal 15, a stopper ring 16, a dust seal 17 and a cover 18 are provided in an opening end of the outer tube 11 to which the inner tube 12 is inserted. A guide bush 19 is provided in an outer peripheral portion of a lower end of the inner tube 12 inserted to the outer tube 11.

A bolt 21 is inserted to a bottom portion of the outer tube 11 via a copper packing 21A, and a hollow pipe 22 fixed by the bolt 21 is erected. A cap bolt 23 is screwed with an upper end portion of the inner tube 12 via an O-ring 23A. A suspension spring 26 is interposed among a partition wall member 50 provided in an upper end portion of the hollow pipe 22 in such a manner mentioned below, a collar 24 supported by the cap bolt 23 and a washer 25.

A piston portion 31 is provided in an outer peripheral portion of an upper end of the hollow pipe 22. An oil chamber 27 is provided in an outer side of the hollow pipe 22. The piston portion 31 is held between an upper end folded portion 32 of the hollow pipe 22 and a stopper ring 33, is provided with a piston ring 31A, and is slidably in contact with an inner periphery of the inner tube 12.

A piston 41 is provided in a lower end inner peripheral portion (a leading end portion) of the inner tube 12. The piston 41 is constituted by an annular upper piece 42 (a passage 42A) engaged with an inner diameter step portion of the inner tube 12, and a tubular lower piece 43 fixed to the upper piece 42 by a lower end caulking portion 44 of the inner tube 12. A check valve 46 is arranged in an inner periphery of an upper taper portion 45A of the lower piece 43. The check valve 46 is energized by a coil spring 47 which is supported in a back surface by the upper piece 42. A taper surface of the check valve 46 is seated on a taper surface of the upper taper portion 45A, and an annular gap 48 is formed between an inner periphery thereof and an outer periphery of the hollow pipe 22.

The piston 41 sections the oil chamber 27 provided in an outer side of the hollow pipe 22 into upper and lower sides. In other words, an upper oil chamber 27A is formed by the inner tube 12, the hollow pipe 22, the piston portion 31 and the piston 41. A lower oil chamber 27B is formed by the outer tube 11 in the lower portion of the piston 41 and the hollow pipe 22. An oil reservoir chamber 28 is provided in an inner side of the hollow pipe 22. The hollow pipe 22 is provided with a plurality of through holes 34 communicating the oil chamber 27 with the oil reservoir chamber 28 in a lower end side of the hollow pipe 22. An orifice 35 communicates the oil chamber 27 with the oil reservoir chamber 28 in an upper end side of the hollow pipe 22. A working fluid is charged in the oil reservoir chamber 28, and a gas chamber 29 is provided in the interior of the inner tube 12 and in an upper portion of the oil reservoir chamber 28.

In this case, a rebound spring 36 during maximum expansion is provided between the upper piece 42 of the piston 41 provided in the inner tube 12, and the piston portion 31 provided in the hollow pipe 22, thereby controlling the maximum expansion stroke. An oil lock piece 37 is held between a lower end portion of the hollow pipe 22 and a bottom portion of the outer tube 11. The maximum compression stroke is controlled by pressurizing the working fluid in a periphery of the oil lock piece 37 by a lower taper portion 45B of the lower piece 43 in the piston 41 at the time of maximum compression.

Further, a hole 43A is provided in a lower piece 43 of the piston 41. A hole 12A is provided in a portion of the inner tube 12 provided with the piston 41. The working fluid in the oil chamber 27 is supplied to the guide bush 13 of the outer tube 11, the guide bush 19 of the inner tube 12, and a space between the tubes held by the guide bushes 13 and 19, thereby lubricating the guide bushes 13 and 19, and compensating a volume of the space between the tubes.

Figure 4:
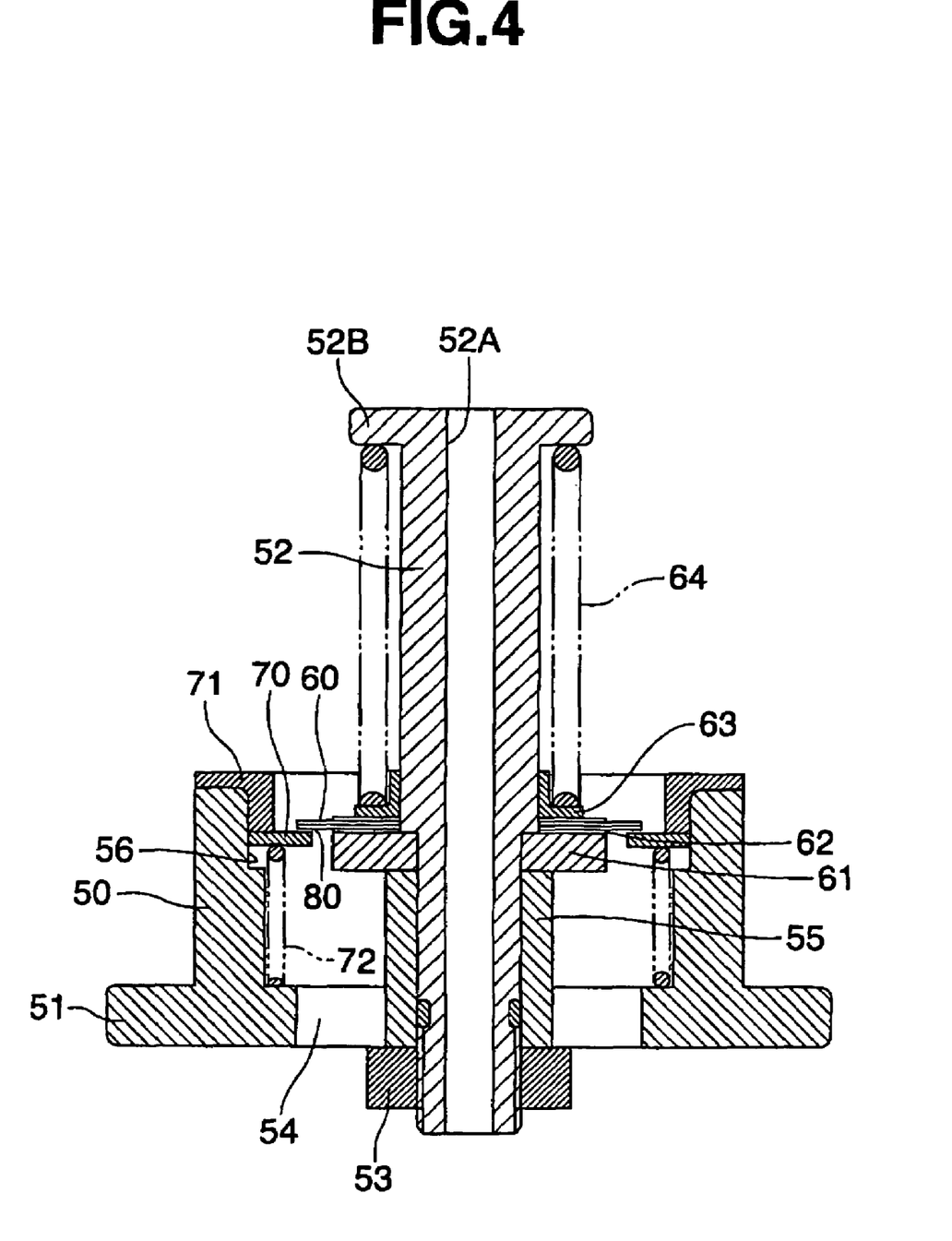
FIG. 4 is a cross sectional view showing a deflection valve and a check valve provided in a partition wall member.
Figure 5:
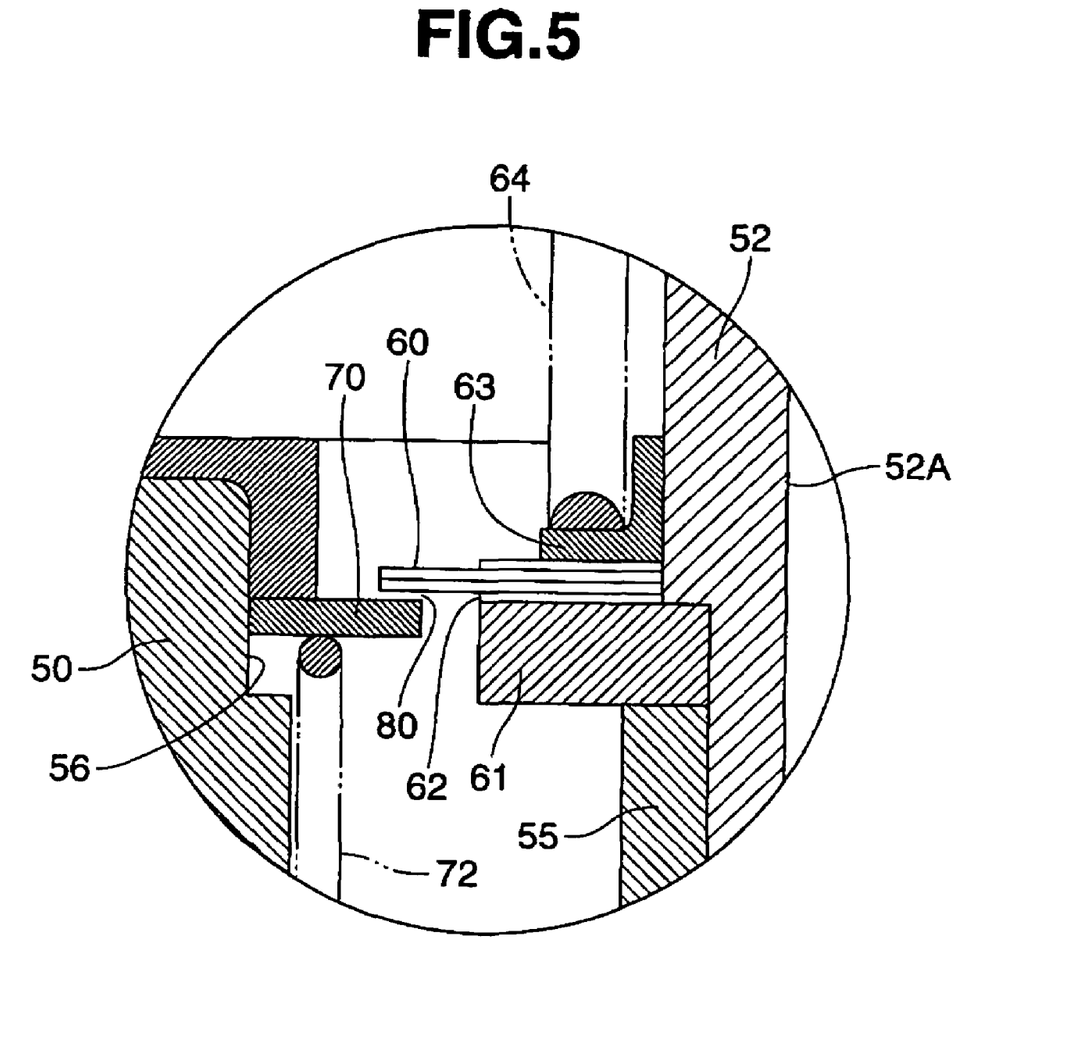
FIG. 5 is an enlarged view of a main portion in FIG. 4.

Accordingly, in the front fork 10, as shown in FIGS. 3 to 5, the partition wall member 50 is provided in the upper portion of the hollow pipe 22. The partition wall member 50 is mounted on the upper end folded portion 32 of the hollow pipe 22, and is held such that a flange portion 51 is held with respect to the upper end folded portion 32 by the suspension spring 26 mentioned above. The partition wall member 50 sections the oil reservoir chamber 28 mentioned above into upper and lower sides, and is provided with a valve guide 52 having a center hole 52A communicating an upper oil reservoir chamber 28A with a lower oil reservoir chamber 28B so as to be fixed by a nut 53. The partition wall member 50 is provided with an expansion and compression common flow passage 54 communicating the upper and lower oil reservoir chambers 28A and 28B in a periphery of the center hole 52A.

The expansion and compression common flow passage 54 formed in the partition wall member 50 is provided with an annular deflection valve 60 when being supported in an inner periphery, and an annular check valve 70 when supported in an outer periphery. An outer periphery of the deflection valve 60 and an inner periphery of the check valve 70 are partially overlapped so as to position the deflection valve 60 in a side of the upper oil reservoir chamber 28A.

The deflection valve corresponding to a laminated body of a plurality of sheet valves is mounted on an upper end surface of a deflection valve front surface side supporting portion 55 around an inserting and attaching hole of the valve guide 52 in the partition wall member 50 via a thick washer 61 having an outer diameter larger than an inner peripheral diameter of the expansion and compression common flow passage 54. A thin shim 62, and a first spring 64 is provided in a back surface of the deflection valve 60, in a side of the upper oil reservoir chamber 28A, via a spring receiver 63 having a diameter smaller than the deflection valve 60. In this case, the washer 61 is held between the front surface side supporting portion 55 of the partition wall member 50 and a step portion of the valve guide 52 so as to be fixed around the valve guide 52 inserted and attached to the partition wall member 50. The first spring 64, the spring receiver 63, the deflection valve 60 and the shim 62 are held between the upper end flange portion 52B of the valve guide 52 and the washer 61 by a spring force of the first spring 64, around the valve guide 52. An inner periphery of the deflection valve 60 is provided in an outer periphery of the valve guide 52 in such a manner as to freely move in an axial direction. The first spring 64 holds the inner peripheral portion of the deflection valve 60 with respect to the washer 61 so as to support in a back surface. The deflection valve 60 is opened when the working fluid in the lower oil reservoir chamber 28B reaches a fixed flow speed.

A guide hole 56 which can receive the check valve 70 is provided in an upper end portion in an outer peripheral side of the expansion and compression common flow passage 54 in the partition wall member 50. An outer periphery of the check valve 70 is slidably fitted to the guide hole 56 so as to freely slide in an axial direction. A valve stopper 71 is fixed to an opening portion of the guide hole 56. A second spring 72 is provided on a back surface of the check valve 70, in a side of the lower oil reservoir chamber 28B. The second spring 72 is received in the interior of the guide hole 56 of the partition wall member 50, and holds an outer peripheral portion of the check valve 70 with respect to the valve stopper 71 so as to support in a back surface.

A small gap 80 is provided in the overlapping portion between the deflection valve 60 and the check valve 70. In accordance with the present embodiment, the small gap 80 is provided owing to an existence of the shim 62 mentioned above. The size of the small gap 80 can be changed by adjusting a thickness of the shim 62.

Accordingly, in the front fork 10, an impact applied to the vehicle is absorbed and reduced by the suspension spring 26 and the air spring in the gas chamber 29. A vibration of the suspension spring 26 generated by absorbing the impact is controlled by the following damping effect.

Compression Stroke

In a compression stroke of the front fork 10, the inner tube 12 descends from an expanded state in FIG. 1 so as to increase pressure in the lower oil chamber 27B. The check valve 46 of the piston 41 moves in an upper direction so as to be opened, whereby the oil in the lower oil chamber 27B is replaced by the upper oil chamber 27A. The oil in an amount calculated by multiplying cross sectional area of the inner tube 12 by a stroke moves from the lower oil chamber 27B to the lower oil reservoir chamber 28B through the through hole 34. When the oil moving to the lower oil reservoir chamber 28B moves to the upper oil reservoir chamber 28, a damping force is generated based on the center hole 52A of the partition wall member 50, the small gap 80 between the deflection valve 60 of the expansion and compression common flow passage 54 and the check valve 70, and the deflection of the deflection valve 60.

In other words, when the piston speed of the front fork 10 is low. A damping force is generated caused by a passage resistance of the center hole 52A and the small gap 80 at the time when the oil in the lower oil reservoir chamber 28B moves to the upper oil reservoir chamber 28A via the center hole 52A of the partition wall member 50, and the small gap 80 of the expansion and compression flow passage 54. The magnitude of the damping force can be changed based on a diameter of the center hole 52A and the size of the small gap 80.

When the piston speed of the front fork 10 is middle, the deflection valve 60 is opened in accordance with a deflecting deformation based on a deflection property, and there is generated a damping force caused by the passage resistance of the oil which moves from the lower oil reservoir chamber 28B to the upper oil reservoir chamber 28A through the opening flow passage of the deflection valve 60. A magnitude of the damping force can be changed in accordance with a thickness and a diameter of the deflection valve 60.

When the piston speed of the front fork 10 is high, the deflection valve 60 is slid in accordance with the deflection of the first spring 64 supporting the deflection valve 60 in the back surface so as to open greatly. The passage resistance applied to the oil which moves from the lower oil reservoir chamber 28B to the upper oil reservoir chamber 28A is reduced. The magnitude of the damping force can be changed based on the spring constant and the set load of the first spring 64. Accordingly, the front fork 10 undergoes a large stroke, and a vibration absorbing property is improved.

Expansion Stroke

In an expansion stroke of the front fork 10, the inner tube 12 ascends from a compressed state in FIG. 2 so as to increase pressure in the upper oil chamber 27A. A damping force is generated caused by a passage resistance generated in the annular gap 48 when the oil in the upper oil chamber 27A moves from the annular gap 48 of the check valve 46 seated on the upper taper portion 45A of the piston 41 to the lower oil chamber 27B. A passage resistance is generated in the orifice 35 when the oil in the upper oil chamber 27A comes out of the orifice 35 in the hollow pipe 22 and moves to the lower oil chamber 27B via the lower oil reservoir chamber 28A and the through hole 34 of the hollow pipe 22.

In this expansion stroke, the oil in an amount calculated by multiplying cross sectional areas of the inner tube 12 by the stroke is resupplied from the upper oil reservoir chamber 28A to the lower oil chamber 27B via the lower oil reservoir chamber 28B. At this time, the oil in the upper oil reservoir chamber 28A passes through the center hole 52A of the partition wall member 50, and moves to the lower oil reservoir chamber 28B while opening the check valve 70.

Figure 6A:
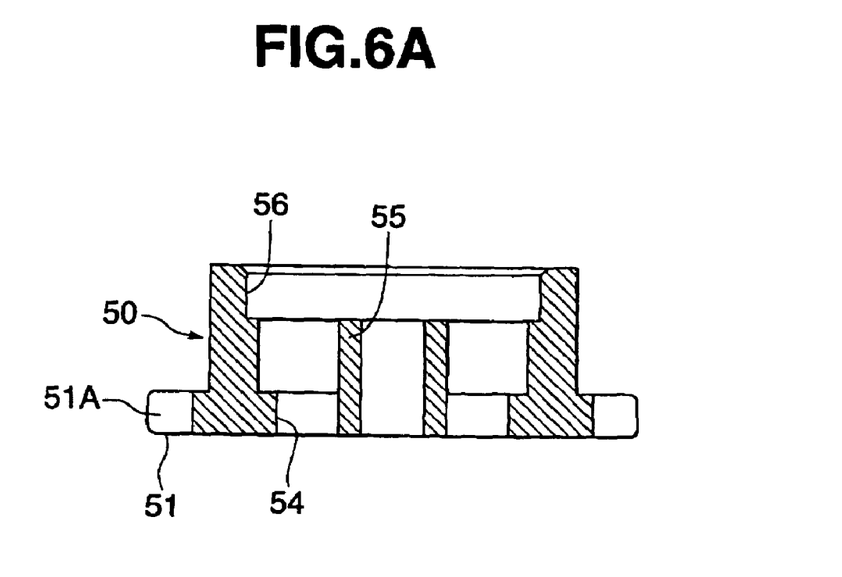
FIG. 6A is a cross sectional view and FIG. 6B is a bottom elevational view.
Figure 6B:
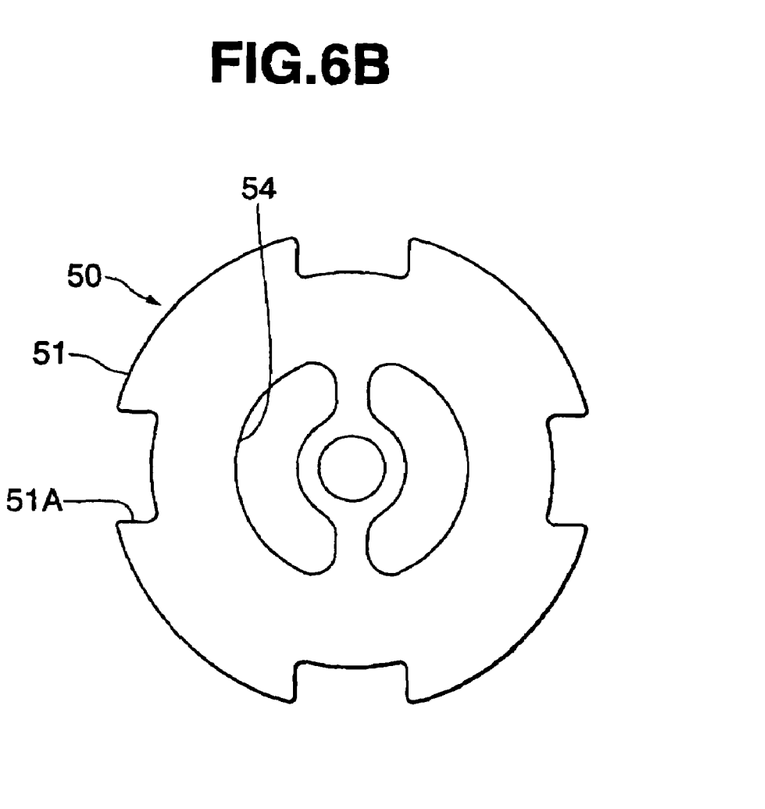

An assembling procedure of the front fork 10 in a manufacturing stage is constituted by the following steps. Inserting the inner tube 12 having the piston 41 assembled, and the rebound spring 36 to the outer tube 11. Arranging the hollow pipe 22 having the piston portion 31 assembled in the outer tube 11 erected together with the oil lock piece 37 by the bolt 21. Charging the working fluid to the interior of the outer tube 11 and the inner tube 12, and thereafter inserting a sub-assembly obtained by assembling the deflection valve 60 and the check valve 70 in the partition wall member 50 to the inner tube 12. The suspension spring 26, the washer 25 and the collar 24 are further inserted to the inner tube 12, and the cap bolt 23 is screwed with the inner tube 12. The partition wall member 50 in accordance with the present embodiment is structured, as shown in FIGS. 6A and 6B, such that notches 51A are provided in a plurality of positions of the flange portion 51 carrying the suspension spring 26 in a peripheral direction, thereby tending to reduce resistance of the oil when the partition wall member 50 is inserted to the upper portion of the hollow pipe 22 in the oil charged in the interior of the inner tube 12 in the assembling process mentioned above.

In accordance with the present embodiment, the following effects can be obtained.

(1) Since the expansion and compression common flow passage 54 is provided in the partition wall member 50, the check valve 70 is immediately closed and the deflection valve 60 is opened so as to achieve the compression stroke. Particularly, when changing from the expansion stroke to the compression stroke. Accordingly, it is possible to improve the response of the damping force when changing between the expansion and compression strokes.

(2) Since the deflection valve 60 is provided, the damping force based on the deflection property of the deflection valve 60 is generated when the piston speed is moderate. In comparison with the conventional structure in which the slide valve is only supported by the spring in the back surface, the damping force in the middle speed range is high, and a buckling feeling is generated in the damping force in the middle speed range. This helps to effectively absorb the vibration which is generated when the vehicle travels, for example, on an undulating road where the front fork 10 vibrates at a low frequency with a large amplitude.

In this case, when the piston speed is high, since the first spring 64 supporting the deflection valve 60 in the back surface is deflected and the deflection valve 60 slides so as to open widely, the flow passage resistance of the oil is reduced and the front fork 10 exhibits a large stroke, so that the vibration absorbing property is improved. This helps to absorb the vibration caused by a large input which is generated when the front wheel runs against a step surface having a one stage higher surface, or when the front wheel passes through the step surface having a one stage higher surface.

(3) Since the small gap 80 is provided in the overlapping portion between the deflection valve 60 and the check valve 70, the freedom of setting and changing the damping force is high. For example, when expanding the center hole 52A provided in the partition wall member 50 so as to set and adjust the damping force, expansion of the center hole 52A is limited in view of a restriction of the size and shape of the partition wall member 50 and the valve guide 52. In the case mentioned above, the same effect as expanding the center hole 52A can be easily obtained by arranging the small gap 80 between the deflection valve 60 and the check valve 70 in comparison with the case of expanding the center hole 52A of the partition wall member 50.

(4) The deflection valve 60 can stably deflect around the spring receiver 63 having the small diameter and corresponding to a supporting point, and can smoothly slide along the valve guide 52.

(5) It is possible to easily set and change the small gap 80 of the deflection valve 60 and the check valve 70 by adjusting the thickness of the shim 62. It is also possible to easily set and change the damping force.

(6) It is possible to inhibit the deflection valve 60 from being inversely warped, in other words, displaced close to the lower oil reservoir chamber 28B, by the washer 61 having a larger outer diameter in the expansion stroke. It is also possible to prevent the deflection valve 60 and the shim 62 from being cracked.

As mentioned above, in accordance with the present invention, it is possible to improve the response of the damping force when changing between the expansion and compression strokes. It is possible to apply the buckling feeling to the compression side damping force in the medium speed range. It is also possible to improve the freedom of setting and changing the compression side damping force, in the front fork in the two-wheeled motor vehicle or the like.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as being limited to the specific embodiment set out above, but should be understood to include all possible embodiments which can be encompassed within a scope of equivalents thereof with respect to the features set out in the appended claims.

What is claimed is:

1. A front fork in a two-wheeled vehicle comprising:
   an inner tube in a vehicle body side being slidably inserted into an outer tube in a wheel side;
   a hollow pipe disposed in a bottom portion of the outer tube; a piston portion provided in an upper portion of the hollow pipe being slidably provided on an inner periphery of the inner tube;
   an oil chamber provided in an outer side of the hollow pipe being sectioned into upper and lower sides by a piston provided in a leading end portion of the inner tube; an oil reservoir chamber communicated with the oil chamber being provided in an inner side of the hollow pipe;
   a gas chamber in an upper portion of the oil reservoir chamber being provided in the interior of the inner tube,
   a partition wall member sectioning the oil reservoir chamber into an upper oil reservoir chamber side and a lower oil reservoir chamber side, the partition wall member being provided with a valve guide having a center hole connecting the upper and lower oil reservoir chamber sides sectioned by the partition wall member, a common flow passage for expansion and compression passing through the partition wall member being formed in a periphery of the valve guide, the common flow passage communicating between the upper and lower oil reservoir chamber[s] sides,
   the common flow passage for expansion and compression formed in the partition wall member being provided with an annular deflection valve in a state of being supported in an inner periphery of the deflection valve, and an annular check valve in a state of being supported in an outer periphery of the check valve, such that the outer periphery of the deflection valve and the inner periphery of the check valve are at least partially overlapped and are directly facing each other when viewed in the axial direction of the valve guide so as to position the deflection valve in a side of the upper oil reservoir chamber, the inner periphery of the deflection valve being slidably provided in an outer periphery of the valve guide, and a first spring being disposed on a back surface of the deflection valve via a spring receiver having a smaller diameter than the deflection valve,
   the first spring generating a force acting against a back surface of the deflection valve and opening the deflection valve when the working fluid reaches a fixed flow speed, and a second spring which generates a force acting against a back surface of the check valve,
   wherein only a small gap is provided between the outer periphery of the deflection valve and the inner periphery of the check valve in the overlapping portion of the deflection valve and the check valve.

2. A front fork in a two-wheeled vehicle according to claim 1, wherein a shim is interposed between a front surface side supporting portion of the deflection valve provided in the partition wall member and the deflection valve, to provide said small gap in the overlapping portion between the deflection valve and the check valve.

3. A front fork in a two-wheeled vehicle according to claim 1, wherein a washer having a larger outer diameter than an inner peripheral diameter of the expansion and compression common flow passage is interposed between a front surface side supporting portion of the deflection valve provided in the partition wall member, and the deflection valve.

4. A front fork in a two-wheeled vehicle according to claim 2, wherein a washer having a larger outer diameter than an inner peripheral diameter of the expansion and compression common flow passage is interposed between the front surface side supporting portion of the deflection valve provided in the partition wall member, and the deflection valve.

* * * * *